United States Patent [19]

Teranishi

[11] Patent Number: 4,789,209
[45] Date of Patent: Dec. 6, 1988

[54] CASING FOR STORING THEREIN A PLURALITY OF CASSETTES

[75] Inventor: Shunichi Teranishi, Anjo, Japan

[73] Assignee: Aisin Seiki Kabushiki Kaisha, Aichi, Japan

[21] Appl. No.: 870,582

[22] Filed: Jun. 4, 1986

[30] Foreign Application Priority Data

Jun. 4, 1985 [JP] Japan .................. 60-084066[U]

[51] Int. Cl.$^4$ .............................. A47B 81/06
[52] U.S. Cl. .................. 312/12; 206/387;
312/15; 312/319; 414/269
[58] Field of Search ........... 312/15, 11, 12, 16,
312/18, 19, 319, 263, 257 R, 257.5 M; 414/269;
206/387

[56] References Cited

U.S. PATENT DOCUMENTS

| | | | |
|---|---|---|---|
| 1,033,014 | 7/1912 | Holstein | 312/15 |
| 3,677,396 | 7/1972 | Staar | 206/387 |
| 3,692,376 | 9/1972 | McKinsey et al. | 312/11 |
| 3,862,787 | 1/1975 | Hilsinger | 312/11 X |
| 3,994,551 | 11/1976 | Ackeret | 206/387 X |
| 3,995,737 | 12/1976 | Ackeret | 312/15 X |
| 4,050,754 | 9/1977 | Coley | 312/15 X |
| 4,052,113 | 10/1977 | Broome | 312/11 |
| 4,221,440 | 9/1980 | Morgan | 312/11 |
| 4,257,524 | 3/1981 | Yonkers et al. | 312/15 X |
| 4,326,653 | 4/1982 | Stone | 206/387 X |
| 4,411,481 | 10/1983 | Berkman | 312/12 X |
| 4,549,775 | 10/1985 | Carter | 312/12 X |
| 4,609,232 | 9/1986 | Florence | 312/11 X |

FOREIGN PATENT DOCUMENTS

492547 4/1977 Australia .................. 206/387

Primary Examiner—Peter A. Aschenbrenner
Assistant Examiner—Thomas A. Rendos
Attorney, Agent, or Firm—Sughrue, Mion, Zinn, Macpeak & Seas

[57] ABSTRACT

A casing for storing cassettes is provided with a plurality of adjacent slots for receiving a plurality of respective cassettes. A resilient bar is disposed adjacent the innermost end of each slot and is provided with a half-round intermediate portion which projects into the slot to engage and position a cassette in the correct location. The opposite ends of the resilient bar are slidably connected to the casing to allow the resilient bar to flex and asorb shocks caused by excessive force in the insertion of the cassette into the slot.

2 Claims, 14 Drawing Sheets

CASING FOR STORING THEREIN A PLURALITY OF CASSETTES

BACKGROUND OF THE INVENTION

The present invention is directed to a casing in which a plurality of cassettes are stored and more specifically to a casing adapted for use in an autochanger in which any one of a plurality of cassettes can be accessed at random, transferred to a processing device, inserted therein for recording or playback and returned to its original position.

In a conventional cassette autochanger, disclosed in Y copending U.S. patent application Ser. No. 844,037, filed May 25, 1986, manipulation of a cassette is as follows:

1. A carrier is transferred so as to be opposed to the selected cassette stored in a slot of a casing.
2. A cassette gripping device of the carrier is moved towards the cassette for gripping the cassette.
3. The cassette device, while holding the cassette, is moved away from the slot.
4. The carrier is transferred so as to be brought in to opposition to an opening of a processor.
5. The gripping device is moved towards the opening for insertion of the cassette into the opening for playing back or recording thereof.
6. The cassette is released from the gripping device after insertion of the cassette into the opening of the processor.
7. After recording or playing back of the cassette the cassette is automatically ejected.
8. The ejected cassette is gripped by the gripping device of the carrier and is brought into opposition to its original slot in accordance with the transfer of the carrier.
9. The cassette is inserted into the slot thereof due to movement of the gripping device towards the slot.
10. Upon stopping of the gripping device the cassette is released therefrom and the gripping device is then moved away from the cassette.

In the aforementioned Step 9 the cassette maybe subjected to excessive insertion into the slot due to a malfunction or excessive movement of the motor which drives the gripping device. As a result the misplaced cassette can not be gripped by the gripping device upon the next selection of the same cassette.

SUMMARY OF THE INVENTION

It is, therefore, a primary object of the present invention to prevent the excessive insertion of a cassette into a storage slot of a casing. It is another object of the present invention to provide a stopper for preventing excess insertion of the cassette.

It is a further object of the present invention to provide a new and improved casing for storing cassettes comprising a pair of parallel vertically spaced apart plates; a plurality of spaced apart wall panels secured between said plates to define a plurality of slots for receiving and storing a cassette in each slot; and resilient abutment means disposed in each slot for preventing excessive insertion of a cassette into a slot. The resilient abutment means is comprised of a flat steel bar having a half-rounded intermediate portion projecting into a respective slot, said flat steel bar being secured for sliding engagement at opposite ends thereof with projecting portions of said plates.

The foregoing and other objects, features and advantages of the invention will be apparent from the following more particular description of a preferred embodiment of the invention as illustrated in the accompanying drawings.

DETAILED DESCRIPTION OF THE INVENTION

Figure 2:
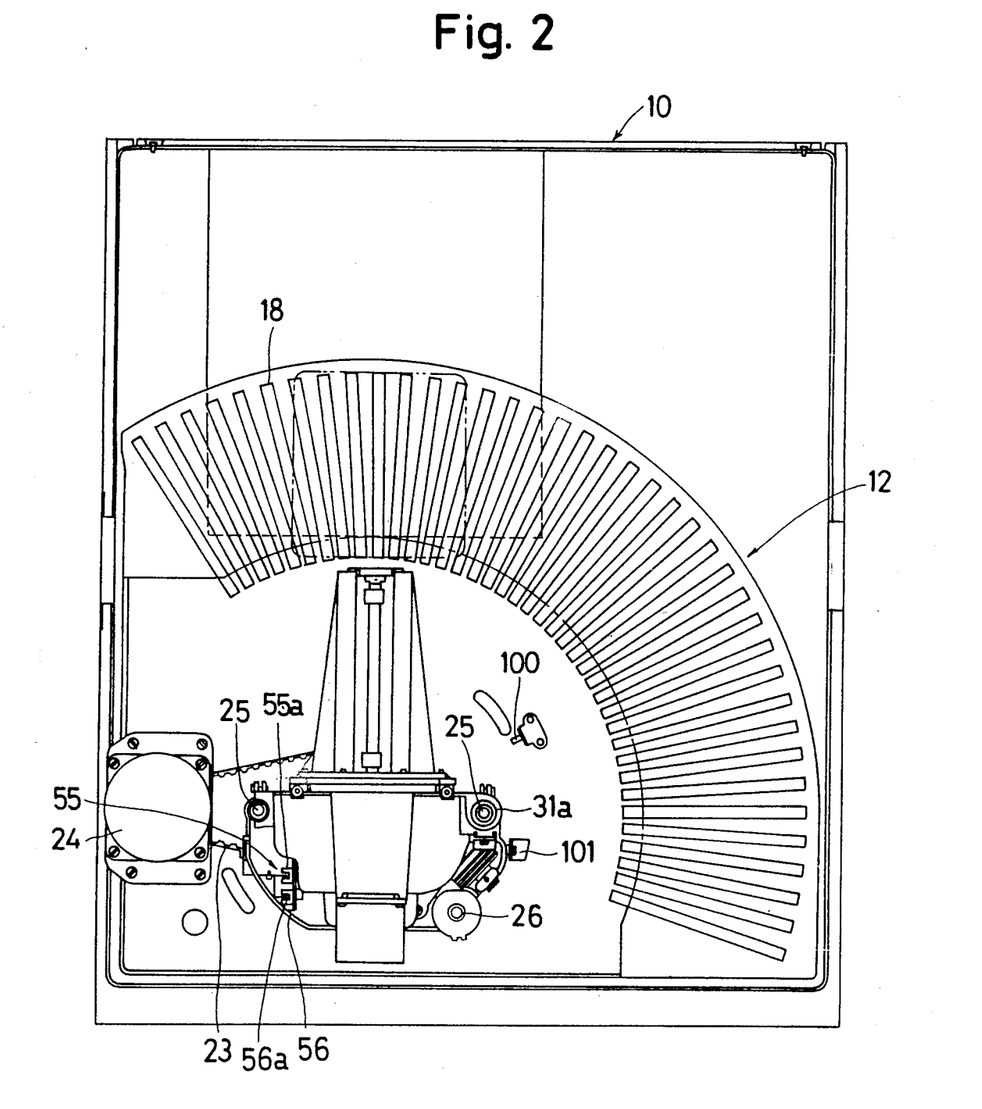
FIG. 2 is a plan view of the device shown in FIG. 1.
Figure 3:
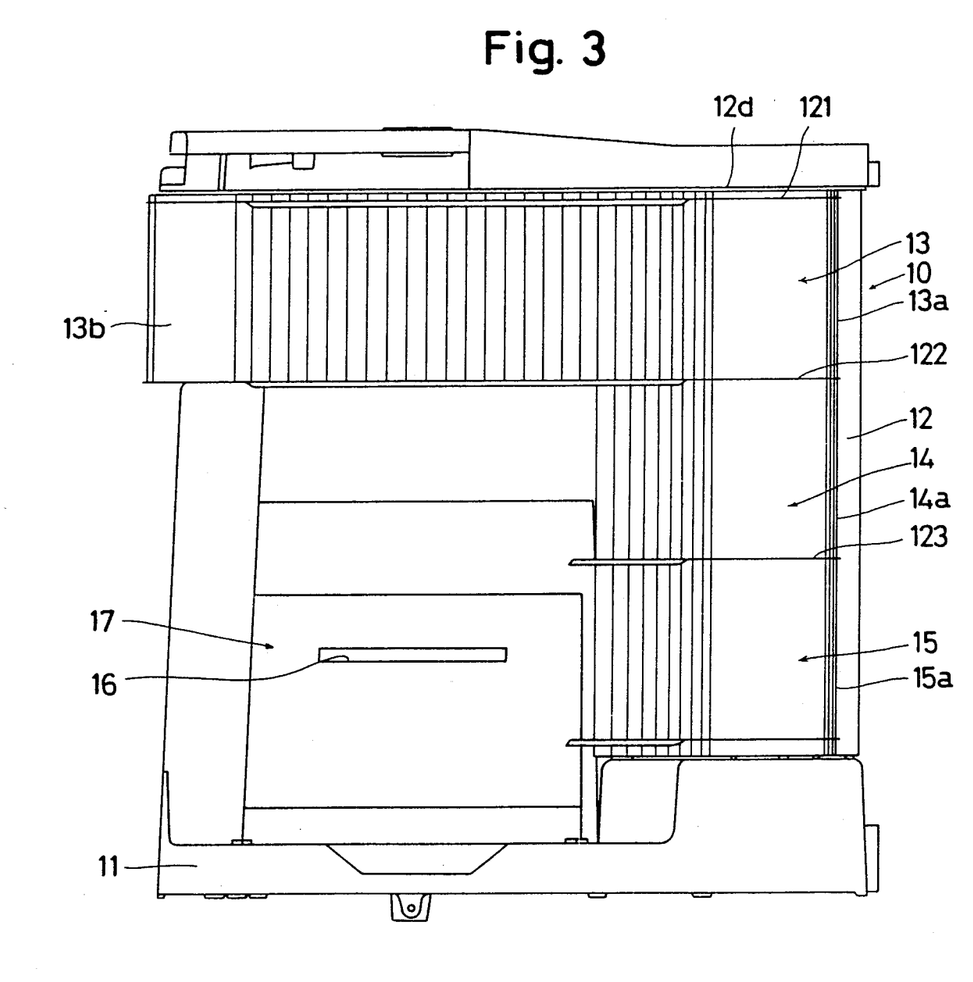
FIG. 3 is a front elevation view of the storing and coding device without the cassette handling device.

The device 10 for storing and retrieving cassettes in accordance with the present invention is provided with a base plate 11 on which a casing 12 is mounted by any suitable means. The casing 12 includes three vertically stacked sections 13, 14 and 15, each of which has a sector configuration with each of the sectors having a common axis. Each section is divided into a plurality of vertically disposed slots S which are radially oriented about the axis of the sectors. Each slot S is adapted to receive the cassette 18 in which a double-recorded laser or optical disc is located. Thus the cassette will be radially disposed about the axis of the sectors as shown in FIG. 2. Either side of the disc in the cassette 18 may be played back and/or recorded in a suitable processing device 17 such as a coder or player.

Figure 8:
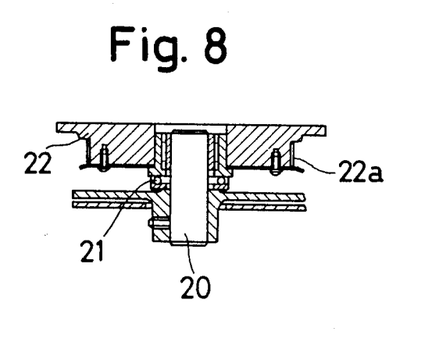
FIG. 8 is a detailed sectional view showing the supporting arrangement between the block member and the base plate.
Figure 9:
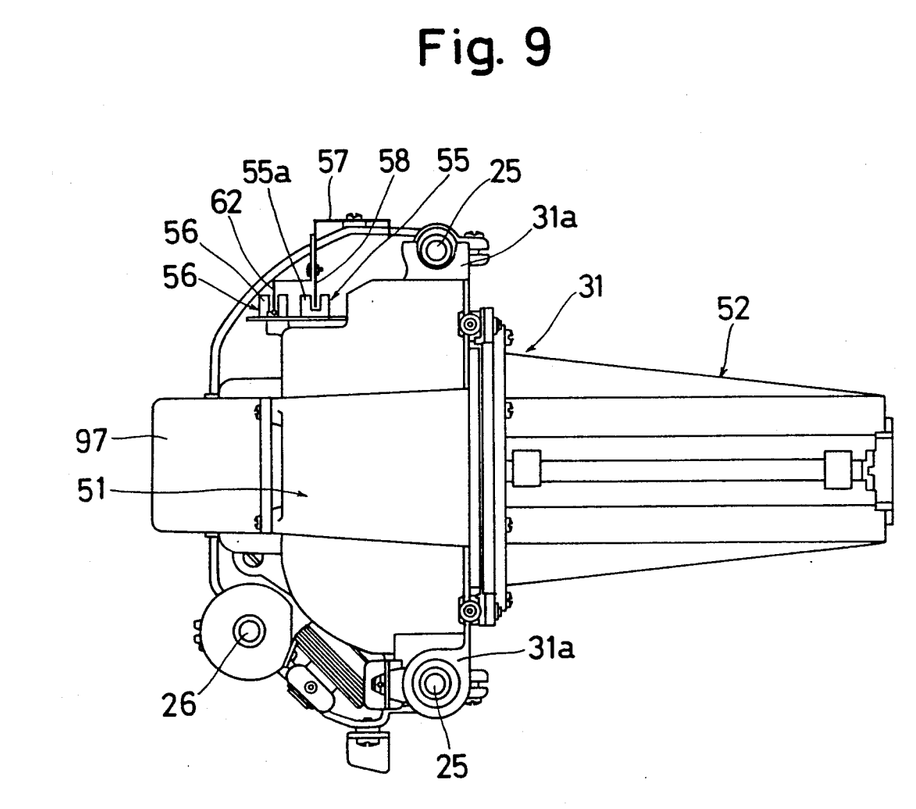
FIG. 9 is a top plan view of the carrier means shown in FIG. 4.
Figure 10:
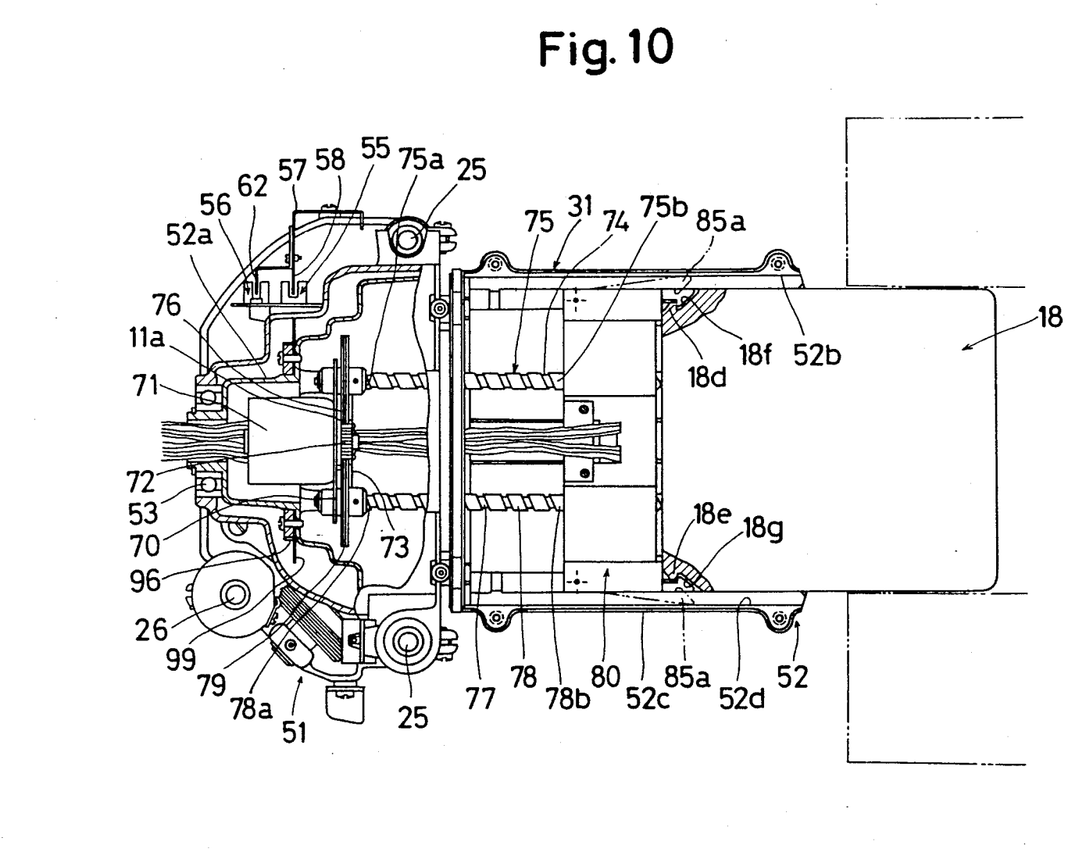
FIG. 10 is a cross sectional view of the carrier means as shown in FIGS. 4 and 9.

In order to insert the cassette 18 which is automatically selected or manually selected by an operator into the processing device 17 through an opening 16 therein, cassette carrier 31 is provided. The carrier 31 includes a main body 51, a gripper 52 rotatably connected to the main body 51 by means of a bearing 53 and a cassette holder 80 which is moveably mounted in the gripper 52 as best seen in FIG. 10. The main body 51 of the carrier 31 is provided at the opposite end portions thereof with a pair of ear portions 31a, 31a which are moveably mounted on a pair of parallel spaced apart rails 25, 25, both of which extend vertically upwardly from a common support member 22. The support member 22 is pivotally mounted in the base plate 11 by means of a pin 20 which is shown in FIG. 8. The vertical axis of the pin 20 is coaxial with the axis of each sector 13, 14, and 15.

Figure 4:
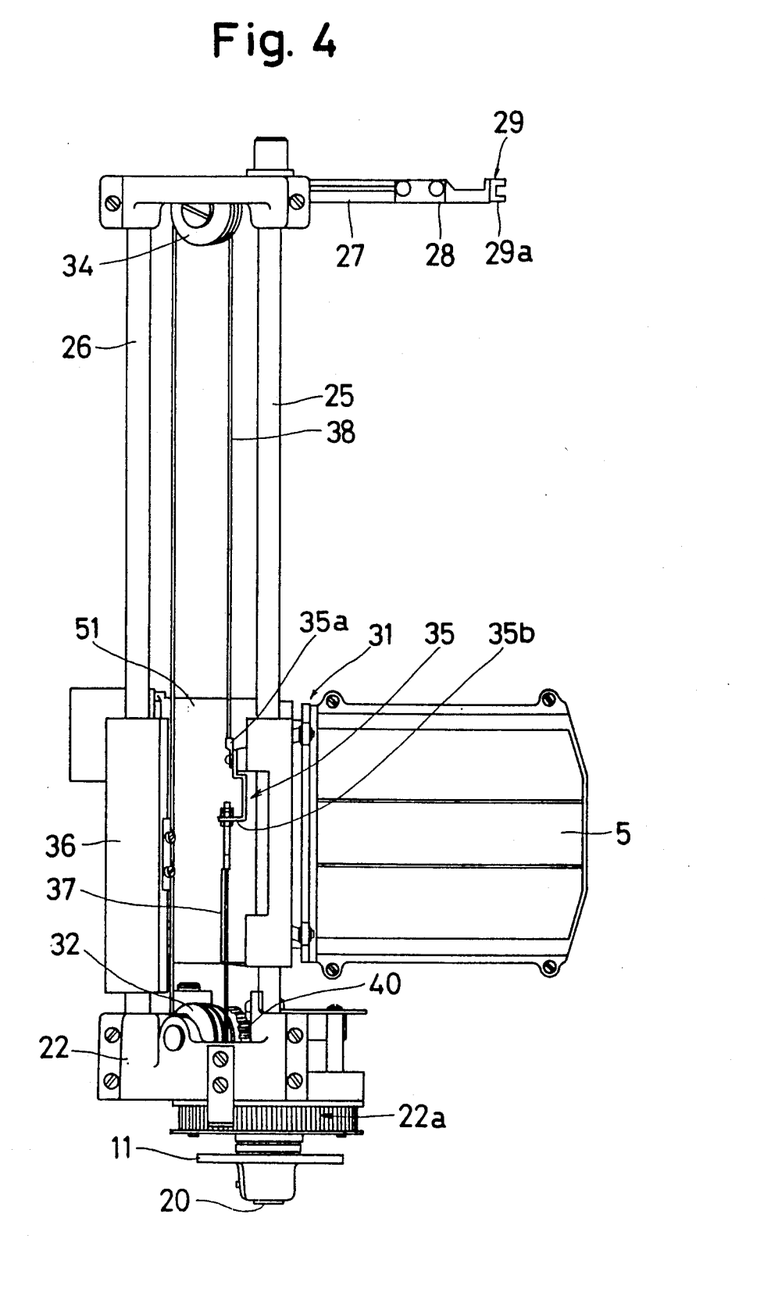
FIG. 4 is a front elevation view showing the guide means and carrier means without the cassette storing means and coder.
Figure 5:
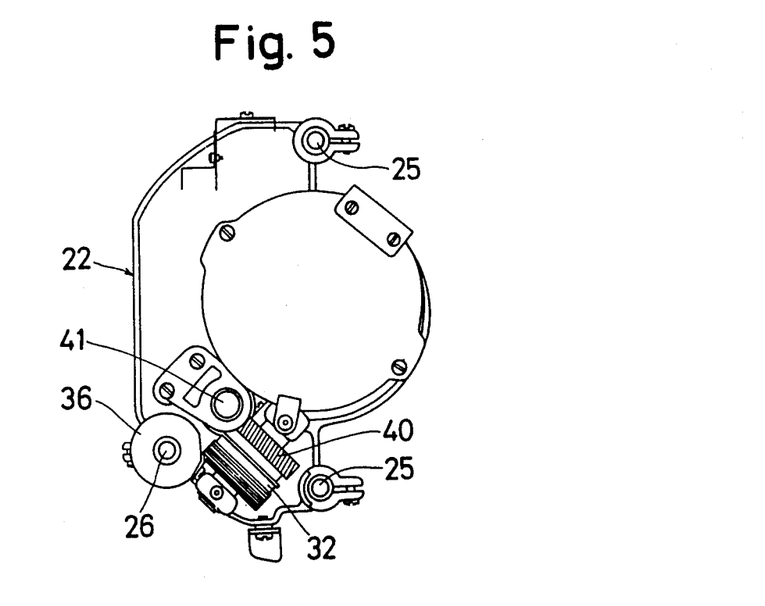
FIG. 5 is a bottom plan view showing a portion of the device as illustrated in FIG. 4.
Figure 6:
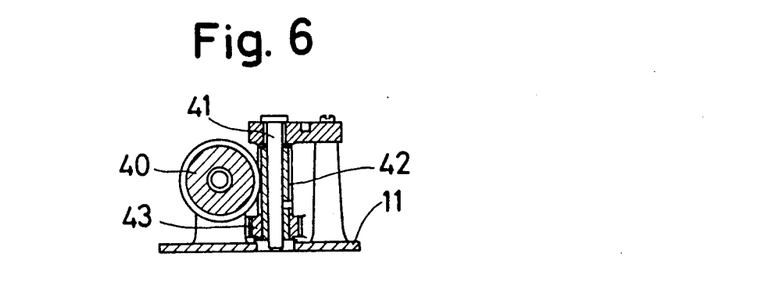
FIG. 6 is a detailed sectional view of the gearing associated with the device as illustrated in FIG. 5.
Figure 7:
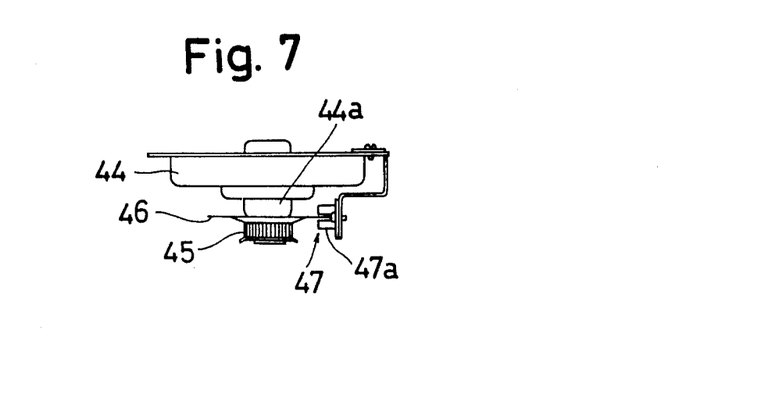
FIG. 7 is a partial elevational view showing the sensing means for detecting the location of the carrier shown in FIGS. 4 and 5.

The support member 22 is provided with a toothed portion 22a which is operatively connected to the drive shaft by a stepping motor 24 by means of a timing belt 23 for rotating the support member 22 about the pin 20. A retainer 35 is fixed to the eared portions 31a of the carrier 31 and is operatively connected to a counter balance 36 which is slidably mounted on a shaft 26 by means of wires 37 and 38. The wire 38 extends about a pulley 34 which is rotatably supported in a cap member 27 and the wire 37 extends about a pulley 32 which is rotatably mounted on the support member 22 as best seen in FIG. 4. The pulley 32 is integrally connected to the gear 40 which is in engagement with the worm gear 42. The worm gear 42 is integrally formed with a gear 43 and the gears 42 and 43 are rotatably mounted on a common shaft 41 as best seen in FIG. 6. The gear 42 is operatively connected to a gear 45 secured to the shaft 44a of a stepping or pulse motor 44, as seen in FIG. 7, so as to move the carrier 31 in the vertical direction along the rails 25, 25.

Each space or slot S in which a cassette 18 is stored is represented by coordinates (V, M) which correspond with the identification number of the cassette 18. The coordinate V can be 1, 2, or 3, to indicate the upper section 13, the middle section 14, and the lower section 15, respectively, and the coordinate M may be any one of a consecutive number or integer which extend from left to right in each section and identify the individual slots or compartments.

Figure 17:
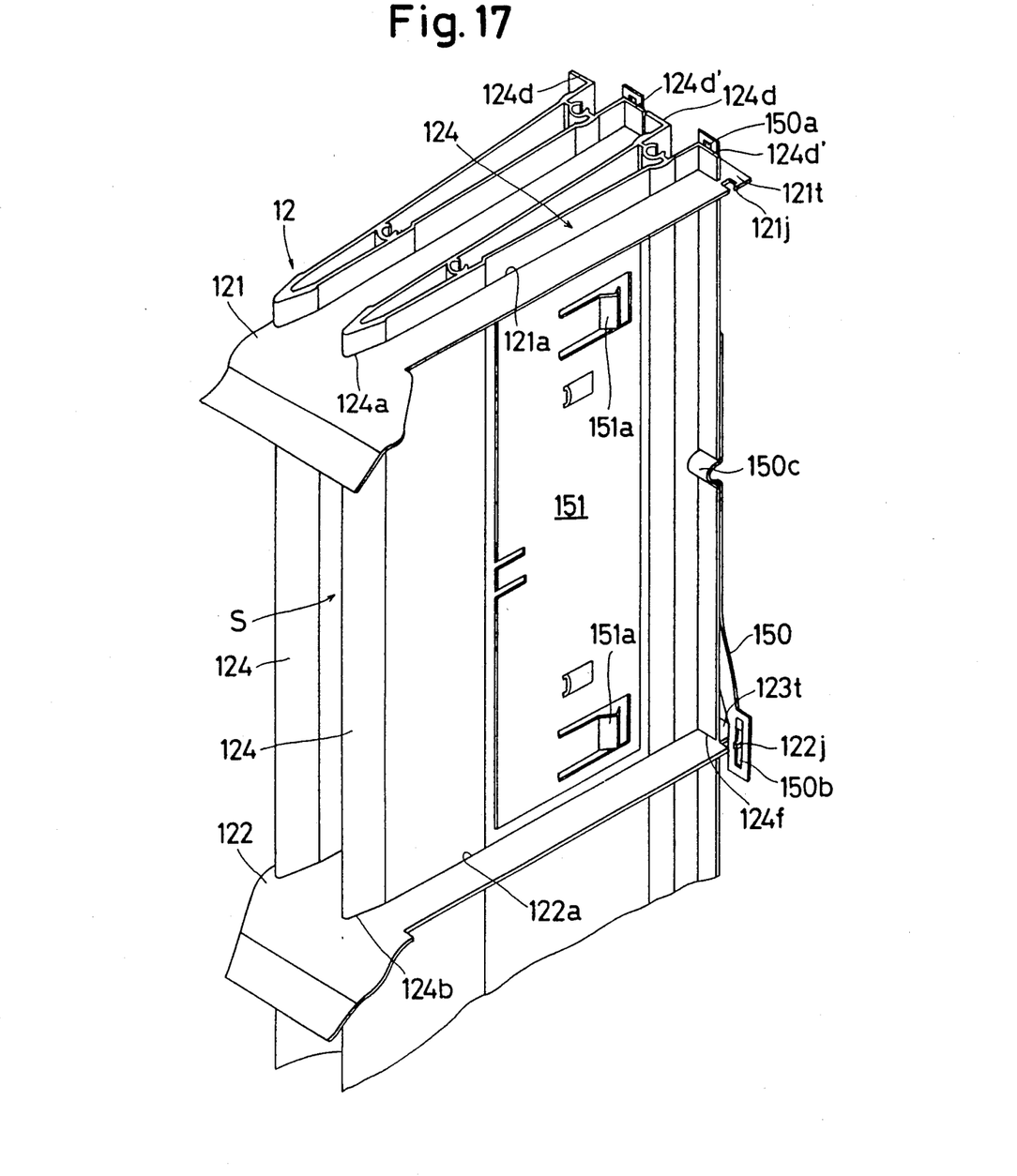
FIG. 17 is a partial perspective view of a casing in which plural cassettes are stored.
Figure 18:
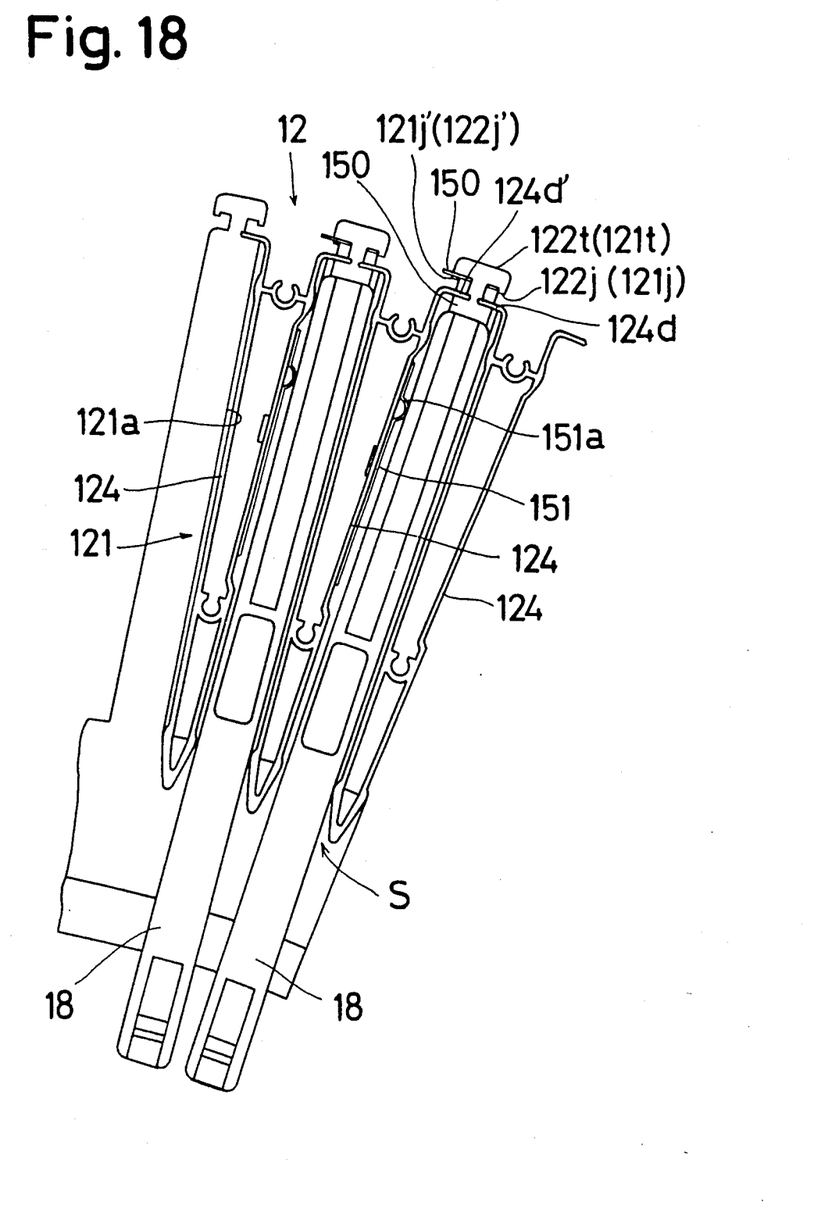
FIG. 18 is a partial plan view of the inside portion of the casing.
Figure 19:
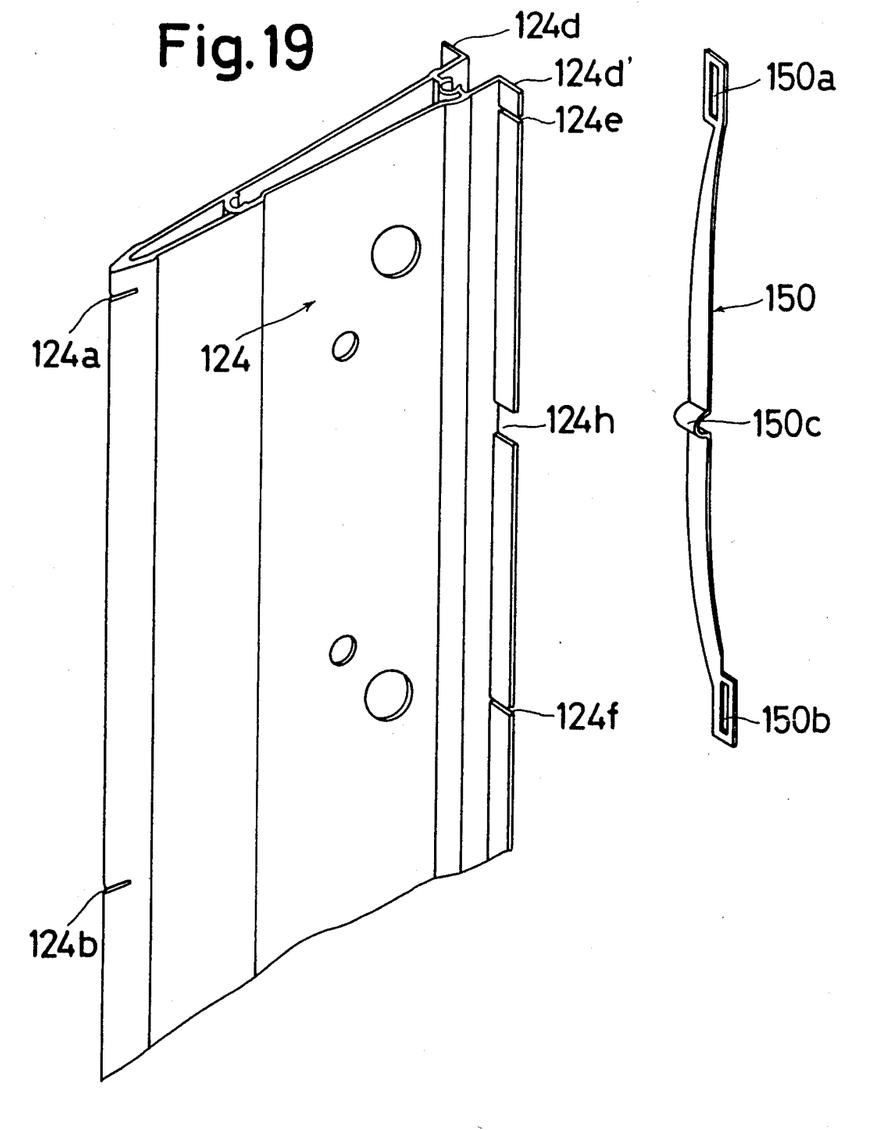
FIG. 19 is a perspective view of a wall panel and a clamp, both of which are components of the casing.

For defining the plural slots S, as best shown in FIGS. 17 through 19, the casing 12 is constituted by a combination of a first plate 121, a second plate 122, and a plurality of wall panels 124. In detail, the first plate 121, formed in sector configuration, is provided at the outer periphery thereof with a plurality of equally pitched or spaced radial notches 121a. Similarly, the second plate 122 has formed therein a plurality of notches 122a. The plates 121 and 122 are disposed in vertically spaced apart, substantially parallel relation to each other. Each wall panel 124 is disposed in a respective pair of aligned notches 121a and 122a and is provided at the front edge portion thereof with spaced notches 124a and 124b which are in engagement, respectively, with the plates 121 and 122 at the end of the notches 121a and 122a. Each panel 124 is also provided at the rear end portion thereof with a pair of circumferentially disposed, oppositely extending flanges 124d, 124d' which are opposed to the corresponding flanges of adjacent panels 124. The flange 124d is formed with spaced notches 124e, 124f and an opening 124h therebetween. Along the outer periphery of the plate 121 a plurality of substantially T-shaped portions 121t are formed integrally therewith in equal pitch. The T-shaped portion 121t has a pair of inward projections 121J and 121J'. Similarly, the plate 122 has T-shaped portions 122T with projections 122J and 122J'.

In order to prevent separation of the panels 124 from the notches in plates 121 and 122 a clamp 150 is employed. The clamp 150 is in the form of a flat resilient steel bar and is provided at opposite end portions thereof with a vertically extending upper slot 150a and a vertically extending lower slot 150b. The upper slot 150a is in sliding engagement with the projection 121J' and the lower slot 150b is in sliding engagement with the projection 122J. A half-rounded portion 150c is formed at the middle portion of the clamp 150 and projects through opening 124h into a slot S so as to prevent excessive insertion of the cassette 18 into the slot S. The shock of the abutment of the cassette 18 against the half-rounded portion 150c is absorbed by the movement of the opposite end slots 150a, 150b relative to the plates 121, 122. At one side of each panel 124 a plate 151 is secured and has a pair of leaf spring portions 151a, 151a for urging the cassette 18 toward the adjacent panel 124. Thus, rattling of the cassette 18 in the slot S is prevented.

Figure 1:
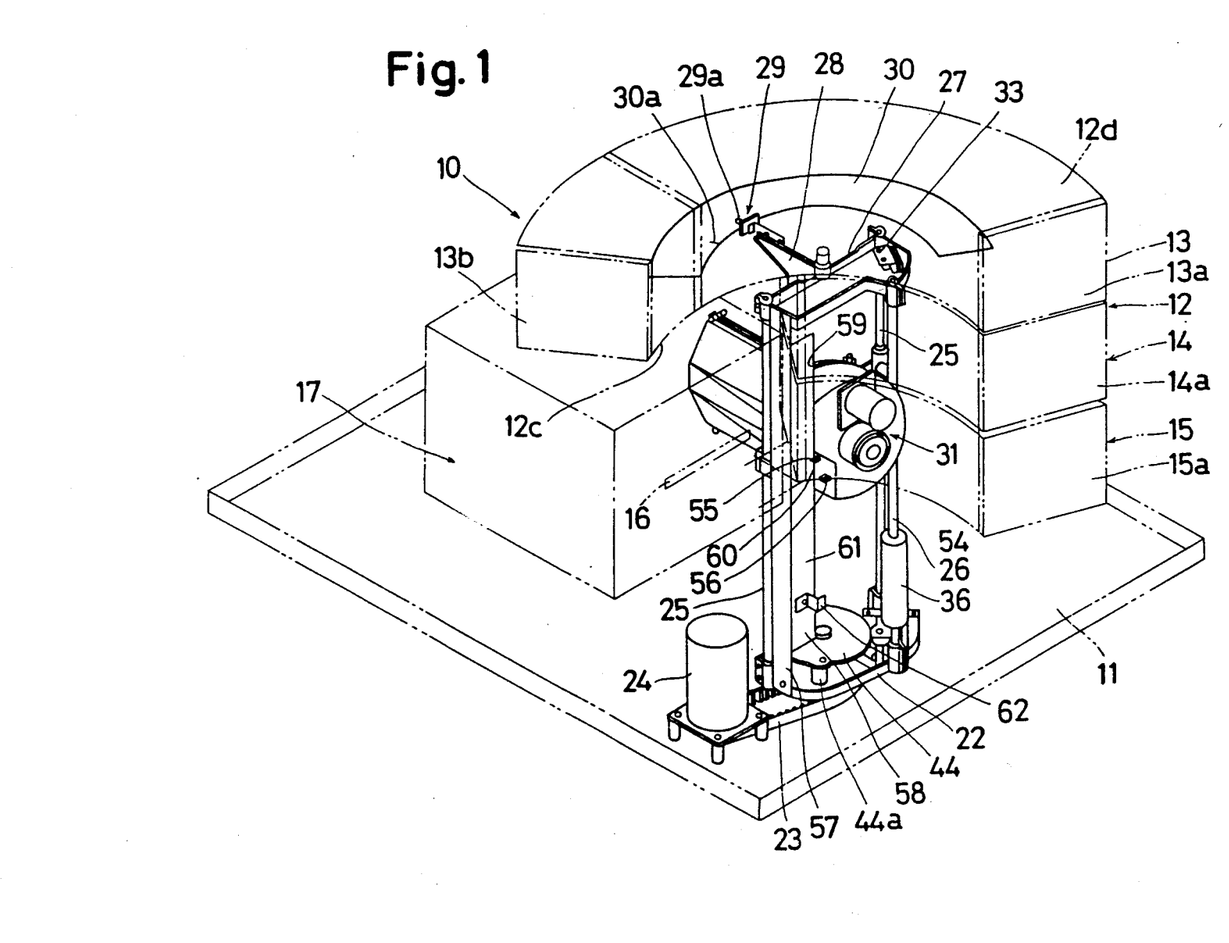
FIG. 1 is a perspective view of a device for storing and retrieving cassettes according to the present invention.

When it is desired to select any one of the cassettes 18, the corresponding compartments or identification number for the selected cassette or corresponding compartment or slot is transmitted from a suitable input device such as a keyboard or the like to the CPU of a computer 50. The carrier 31 is then moved upwardly by the motor 44 and is rotated about the vertical axis by means of the motor 24 so as to be aligned with the selected cassette 18. In order to determine whether the carrier 31 is brought into alignment with the desired cassette 18 a vertically extending plate 58 is mounted on support member 22 and is provided with a plurality of equally spaced slits 59, 60 and 61 along a vertically disposed edge thereof. A detector 55 having bifurcated detecting portions 55a is secured to the carrier 31 and encompasses the vertically disposed edge of the plate 58 having slits 59, 60 and 61 thereon. Thus the sensor 55 can determine when the carrier reaches the desired vertical position corresponding to the desired sector 13, 14, or 15. A sectoral plate 30 is secured to the upper surface 12d of the casing 12 which encloses the sectors 13, 14 and 15 and is provided with a plurality of equally spaced slits 30a which extend radially outwardly from the inner edge thereof in correspondence with each cassette. A sensor 29 is secured to the cap portion 27 by means of a support bracket 58 as best seen in FIGS. 1 and 4. The sensor 29 is similar to the sensor 55 and is provided with a U-shaped detecting portion 29a which encompasses the edge of the sector plate 30 having the slits 30a therein whereby the carrier 31 may be selectively aligned with any desired cassette. The slits 59, 60 and 61 correspond to $V=1$, $V=2$, $V=3$, respectively while the slits 30a correspond to the storage spaces in each sector 13, 14 and 15.

Figure 13:
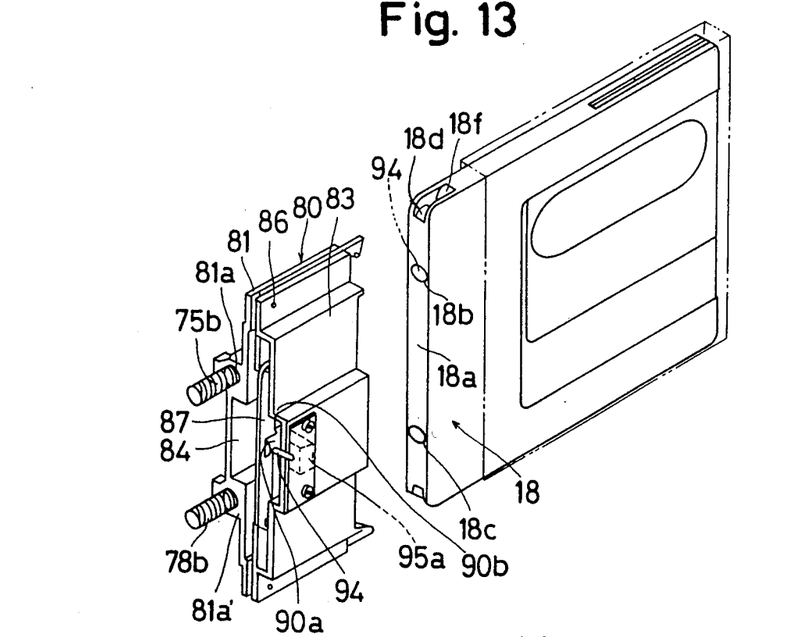
FIG. 13 is an exploded perspective view of a holder and a cassette to be held thereby.
Figure 14:
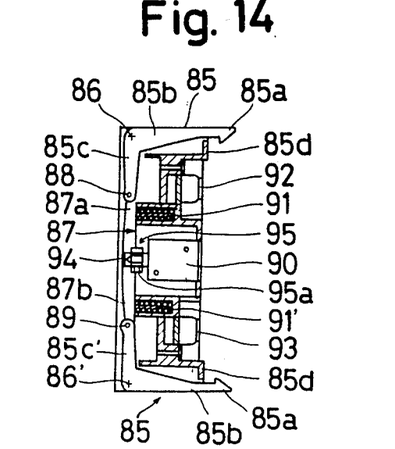
FIG. 14 is a vertical sectional view of the holder as shown in FIG. 13.

A cassette gripping device 80 is moveable within the gripper housing 52 along a horizontal axis whereby the gripping device 80 may be brought into position for gripping a selected cassette and removing it from the storage compartment. The cassette gripping device is driven by means of a stepping or pulse motor 71 having a gear 72 fixed to the output shaft thereof which in turn is disposed in meshing engagement with a pair of gears 79, 79, each of which is fixedly secured to the left end portion 75a, 78a, of the shaft 75, 78, respectively. Each of the shafts 75, 78 is provided with spiral grooves 74 and 77, respectively, and each shaft is rotatably supported in a support plate 70 which is secured to the motor 71. The cassette gripping device 80, as best seen in FIGS. 13 and 14, is provided with main body 81 having a pair of holes 81a and 81a' for receiving the end portions 75b and 78b of the shafts 75 and 78, respectively. A pin (not shown) is fixedly secured in each hole 81a and 81a' and is disposed in sliding engagement with the groove 74 of the shaft 75 and the groove 77 of the shaft 78, respectively. Thus upon rotation of the shafts 75 and 78 by the motor 71, the cassette gripping device 80 will be moved horizontally toward or away from the cassette storage compartment depending on the direction of rotation of the motor 71. A pair of pivoted engaging members 85, 85' are pivotally mounted at the upper and lower corners of the holder 80 by means of pins 86, 86' for pivotal movement in a vertical plane between the main body 81 and a cover plate 83. The engaging members 85, 85' are provided with horizontal arm portions 85b and 85'b having pawl portions 85a and 85'a at the outer ends thereof respectively. Each engaging member 85, 85' is also provided with a vertical portion 85c, 85'c which are disposed at right angles to the respective horizontal portions. An intermediate lever 87 is pivoted at the upper and lower end portions 87a, 87b to the ends of the vertical portions 85c, 85'c by means of pins 88, 89, respectively. The upper and middle end portions of the lever 87 are biased by means of springs 91 and 91' to normally bias the horizontal portions 85b and 85'b of the engaging members 85, 85' into engagement with stopper portions 85d, 85'd, respectively. The middle portion of the lever 87 is loosely fitted into a groove 90b formed in the end of the shaft 90a of a solenoid 90 by means of a pin 94. The lever 87 may be moved to the right as viewed in FIG. 14 against the force of the springs 91 and 91' by movement of the shaft 90a upon energization of the solenoid 90.

The cassette gripping device 80 is provided with a set of vertically spaced optical sensors 92 and 93 which are disposed in opposition to the portions 18b, 18c, respectively, on the end portion 18a of a cassette 18. Upon movement of the cassette gripping device 80 towards the cassette 18 the pawls 85a, 85'a are brought into engagement with the concave portions 18f, 18g, formed at the upper and lower portions of the cassette 18 after passing over the projections 18d, 18e. During such movement of the pawls, the lever 87 is moved in the horizontal direction against the force of the springs with the result that the lever 87 moves between the bifurcated detecting portion 95a of an optical sensor 95 to provide a signal indicative of the engagement of the pawl with the cassette.

Figure 11:
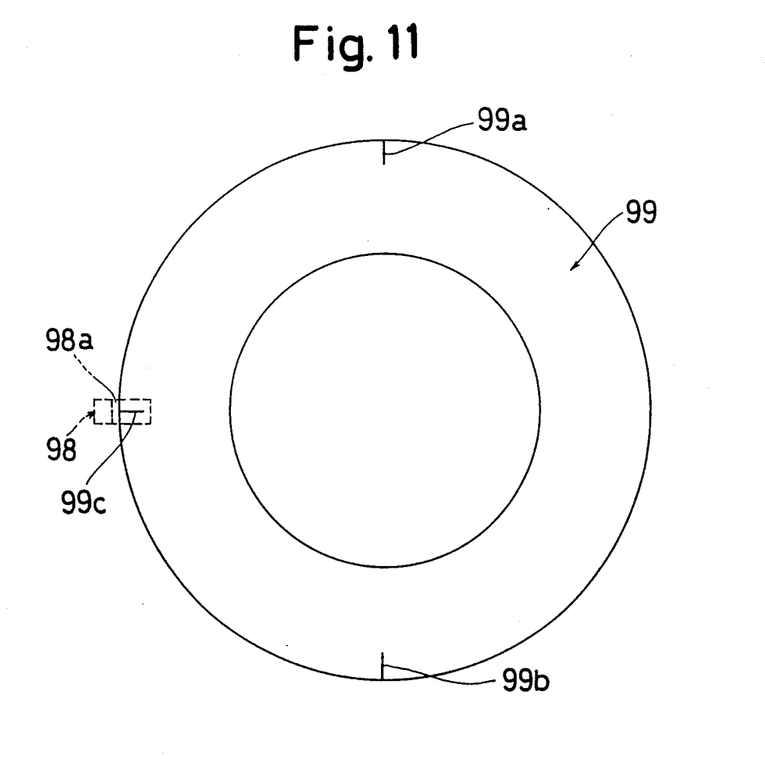
FIG. 11 is a detailed plan view of a sensing device for checking the rotation of the gripper.
Figure 12:
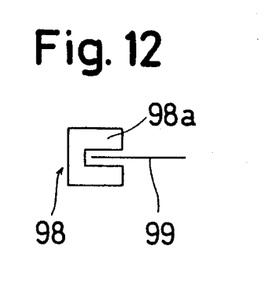
FIG. 12 is a partial elevation view of the sensing arrangement shown in FIG. 11.

With the pawls 85a and 85'a being disposed in gripping engagement with the selected cassette 18 the cassette gripping device 80 is retracted by means of the motor 71 and the rotating shafts 75 and 78 to withdraw the selected cassette 18 from the storage compartment to locate it within the gripper housing 52. While the carrier 31 is being moved in the vertical direction along the rails 25, 25, the gripping assembly with the cassette therein may be rotated through ninety degrees in either direction so as to properly orient the selected cassette for insertion into the processing device 17 through the slot 16. In order to rotate the gripping assembly, a stepping or pulse motor 97 is operatively connected to a gear 96 fixed to the base portion 52a of the gripper assembly 52 by means of a timing belt (not shown). A plate 99 rotatable with the gear 96, as illustrated in FIGS. 10-12, is provided with three slits 99a, 99b, and 99c. The edge of the slit 99 extends through the bifurcated detecting portion 98a of a sensor 98. While the slit 99c is normally disposed in alignment with the sensor 98 when the cassette is vertically disposed, the alignment of the slit 99a or 99b with the sensor 98 will confirm that a ninety degree rotation of the cassette has taken place in one direction or the other.

The carrier 31 is initially positioned at the original or home position which is detected by the sensor 56 on the carrier 31 which detects the projection 62 on the plate 58 and the sensor 100 on the base 11 which detects the projection 101 on the carrier 31, as shown in FIG. 2. Upon receiving the appropriate input information regarding the cassette to be selected the carrier 31 will move to bring the gripping assembly 52 into alignment with the selected cassette. The cassette will then be withdrawn from the storage compartment and transferred with the proper orientation to the processing device 17 whereupon the cassette will be inserted through the slot 16 for suitable processing. After processing the cassette will be withdrawn and returned to its storage compartment whereupon the carrier 31 will return to its home position unless it has received instructions for selecting a different cassette.

Figure 15:
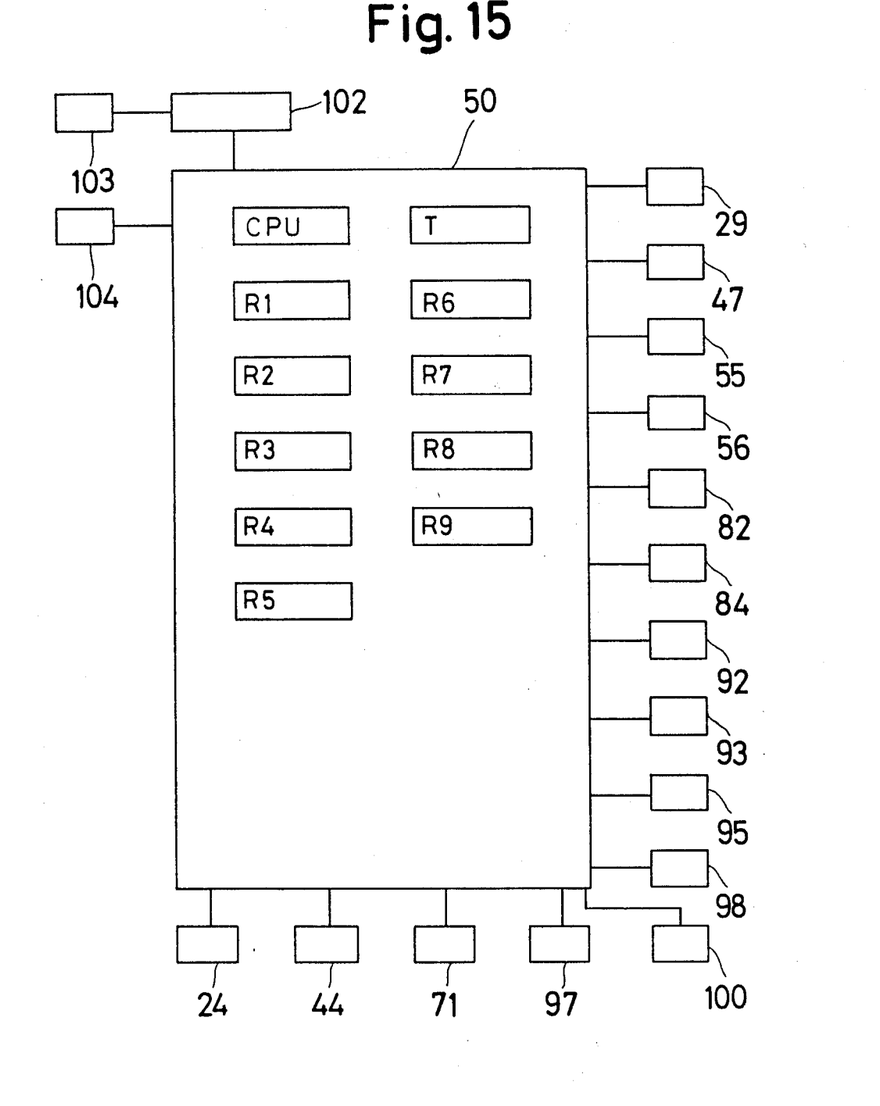
FIG. 15 is a block diagram of the control means for the device according to the present invention.
Figure 16:
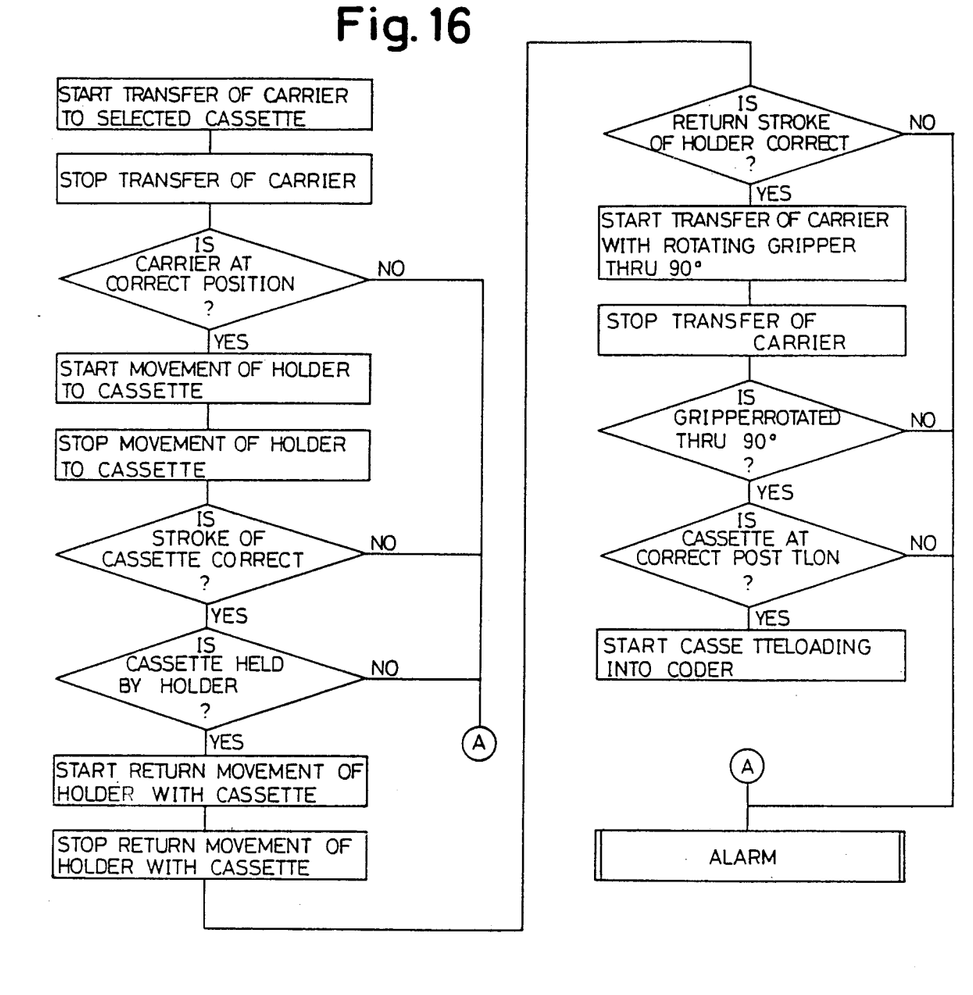
FIG. 16 is a flow chart showing the operation of the device according to the present invention.

The overall sequential operation of the device 10 is controlled by the computer 50 which is connected to a main computer 102 which is operable under the control of a keyboard 103. A suitable CRT may be provided if necessary. When the data indicating the serial number of the cassette 18 to be selected and the data indicating the side of the disc in the cassette which is to be processed are transmitted from the keyboard 103 to the computer 50 the serial number data is stored in a register R1 and the disc side data is stored in a register R2. A table T corresponding to the serial numbers of the cassettes and corresponding coordinates is stored in the computer 50 and the input data with respect to the serial number of the selected cassette is compared to the table T so that the corresponding values of V and M are loaded into registers R3 and R4, respectively. The rotation of the motor 44 is controlled in accordance with the values in the register R3 and the rotation of the motor 24 is controlled in accordance with the values in the register R4 to move the carrier 31 the desired distance in the upward direction along the guides 25 and is rotated the carrier at the desired angle to bring the gripper assembly 52 of the carrier 31 into alignment with the selected cassette.

A check as to whether or not the carrier 31 is stopped at the correct position is performed by the sensors 55 and 29 as previously described. If the position of the carrier 31 is not correct the resulting or abnormal condition so detected is processed by the computer and an alarm mechanism 104 such as a buzzer or the like is actuated for the attention of an operator.

After confirming that the carrier 31 is in the correct position, the motor 71 is brought into operation under the control of the computer 50. The proper number of rotations of the shaft of the motor 71 are carried out so that the shafts 75 and 78 are rotated the desired amount so that the cassette gripping device 80 is moved into connective engagement with the cassette. A check as to whether the cassette gripping device is moved the desired distance is performed by counting the number of times the slit 73a of the plate 73 is detected by the sensor 84. Such a count is fed into the register R6 and the content thereof is compared to a set rotational member for the shaft of the motor 71 in a register R5. Unless the value in the register R6 is equal to that in the register R5 a signal of the abnormal condition is transmitted to the alarm mechanism 104 by the computer 50.

A check as to whether or not the selected cassette is properly held by the cassette gripping device 80 is performed as a result of the lever 87 being moved into detecting position relative to the sensor 95 as described above when the gripping pawls move over the projections 18d and 18e on the cassette. If the sensor 95 detects the movement of the lever 87 a "1" is fed into the register R7. If the cassette 18 is not held by the gripping device for any reason whatsoever a "0" is fed into the register R7 and the rotation of the motor 71 is stopped. Such a condition is detected by the computer 50 which in turn actuates the alarm mechanism 104.

After receiving confirmation that the cassette 18 is held by the cassette gripping device 80, the sensors 92 and 93 are brought into operation to sense a reflection of the mark 94. Upon sensing a reflection of the mark 94 by the sensor 92 or 93 the "1" is fed into the register R8 or R9, respectively. Otherwise a "0" is fed into the register R8 or R9, respectively. In this embodiment if the sensor 92 senses a mark 94 and the sensor 93 senses no mark a "1" and a "0" are fed to the register R8 and the register R9, respectively. If the value in the register R8 and the value in the register R9 are equal to each other, the computer 50 issues an alarm through the alarm mechanism 94 which indicates trouble in one sensor or the other and/or the existence of no mark 94. If the value of the register R8 differs from the value of the register R9 the motor 71 is driven in the reverse direction so as to return the cassette gripping device 80 with the cassette 18 to its position within the gripping assembly 52.

After completion of the return movement of the cassette gripping device 80, the carrier 31 is transferred to the loading or inserting position by driving motors 24 and 44. During the transfer movement of the carrier 31 the side of the disc in the cassette 18 to be played is directed upwardly by rotating the gripping assembly 52 through a ninety degree angle depending upon the value in the register R2 and the value in the register R8. A check as to whether or not the ninety degree rotation of the gripper 52 is correctly carried out is performed by the detection of the slit 99a or 99b in the plate 99 by means of the sensor 98.

As soon as the carrier 31 is transferred to the loading position the cassette gripping device 80 is projected outwardly of the gripping assembly 52 for insertion of the cassette 18 into the processing device 17 through the opening 16. After the completion of the cassette insertion into the processing device 17, the cassette gripping device 80 releases the cassette 18 and is then retracted into the gripping assembly 52. The processing device 17 is then brought into operation with respect to the cassette 18 therein. Picture images on the disc can be seen by means of a CRT. Upon completion of the processing of the cassette 18, the cassette 18 is automatically withdrawn through the opening 16 in the processing device 17 by means of the cassette gripping device and is then returned to its original slot S by means of the carrier 31.

Upon excessive insertion of the cassette 18 into the slot S due to unexpected operating conditions with respect to the motor 17 for driving the gripping device 80, the cassette 18 which is being held by the gripping device 80 is bought into abutment with the half-rounded portion 150c of the clamp 150. Following such abutment, the half-rounded portion 150c of the clamp 150 is moved in the outward direction and the opposite end portions of the clamp 150 are moved in the vertical direction relative to the plates 121, 122. After release of the cassette 18 from the gripping device 80 the solenoid 90 is energized to retract the shaft 90a thereby pivoting the pawls out of engagement with the corner portions of the cassette 18. The cassette 18 moves outwardly to some extent due to restoration of the half-rounded portion 150c of the clamp 150 to its normal condition. Thus, the cassette 18 is set at a position at which the cassette 18 can be gripped upon the next operation of the cassette holding device 80.

While the invention has been particularly shown and described with reference to preferred embodiments thereof it will be understood by those in the art that the foregoing and other changes in form and details may be made therein without departing from the spirit and scope of the invention.

What is claimed is:

1. A casing for storing therein a plurality of cassettes comprising:
    a pair of parallel, vertically spaced apart plates having notches therein;
    a plurality of spaced apart, vertically extending wall panels disposed in said notches and secured between said plates to define a plurality of slots for receiving and storing a cassette in each slot;
    each of said wall panels having a pair of oppositely extending flanges along a vertical edge thereof in alignment with the flanges of adjacent panels to define an end wall for each slot; and
    an elongated resilient member slidably engaged at opposite ends thereof with each plate respectively and disposed externally of each slot in alignment with each pair of flanges defining each end wall of a slot to hold said panels in said notches;
    wherein at least one of said flanges defining an end wall of each slot is provided with an aperture located intermediate said plates; and
    wherein each resilient member has a projection portion intermediate the end thereof extending through each aperture into a respective slot for engagement by a cassette to properly locate a cassette in each slot.

2. A casing as set forth in claim 1, wherein each of said slots has a width greater than the maximum width of a cassette and further comprising spring means formed of one piece construction with one of said wall panels defining a slot for urging a cassette against the other of said wall panels defining a slot wherein said spring means is disposed in sliding engagement with a cassette during loading/unloading thereof and holding said cassette against rattling within the slot.

* * * * *